United States Patent
Korat

(10) Patent No.: US 9,032,362 B2
(45) Date of Patent: May 12, 2015

(54) SYSTEM AND METHOD FOR GENERATING HIGH PERFORMANCE CALCULATORS FOR CALCULATION GRAPHS

(75) Inventor: Eduard Korat, Campbell, CA (US)

(73) Assignee: SAP SE, Walldorf, DE (US)

(*) Notice: Subject to any disclaimer, the term of this patent is extended or adjusted under 35 U.S.C. 154(b) by 290 days.

(21) Appl. No.: 13/608,700

(22) Filed: Sep. 10, 2012

(65) Prior Publication Data

US 2014/0075408 A1    Mar. 13, 2014

(51) Int. Cl.
   G06F 9/44    (2006.01)
   G06Q 10/06  (2012.01)

(52) U.S. Cl.
   CPC ....... *G06F 8/355* (2013.01); *G06F 8/35* (2013.01); *G06F 9/4436* (2013.01); *G06Q 10/06* (2013.01)

(58) Field of Classification Search
   CPC ............................................. G06F 8/33–8/355
   USPC ........................................ 717/104; 705/50–80
   See application file for complete search history.

(56) References Cited

U.S. PATENT DOCUMENTS

| | | | |
|---|---|---|---|
| 6,038,538 A * | 3/2000 | Agrawal et al. | 705/7.11 |
| 6,279,009 B1 * | 8/2001 | Smirnov et al. | 1/1 |
| 7,533,387 B1 * | 5/2009 | Massoudi | 719/328 |
| 8,195,643 B2 * | 6/2012 | Weyerhaeuser et al. | 707/713 |
| 8,484,159 B2 * | 7/2013 | Stanfill et al. | 707/609 |
| 8,549,529 B1 * | 10/2013 | Schildan et al. | 718/104 |
| 8,572,236 B2 * | 10/2013 | Sherb et al. | 709/224 |
| 8,667,329 B2 * | 3/2014 | Douros et al. | 714/15 |
| 8,676,818 B2 * | 3/2014 | Curbera et al. | 707/755 |
| 8,706,667 B2 * | 4/2014 | Stanfill et al. | 706/45 |
| 8,875,145 B2 * | 10/2014 | Atterbury et al. | 718/102 |
| 2004/0260590 A1 * | 12/2004 | Golani et al. | 705/8 |
| 2006/0059461 A1 * | 3/2006 | Baker et al. | 717/113 |
| 2006/0294150 A1 * | 12/2006 | Stanfill et al. | 707/200 |
| 2007/0294678 A1 * | 12/2007 | Novoselsky | 717/144 |

(Continued)

OTHER PUBLICATIONS

Modeling and Estimation of Cooperative Index for Multi-Agent Systems Using Execution Graph S. Ajitha, T.V. Suresh Kumar, D. Evangelin Geetha, and K. Rajani Kanth M.S. Ramaiah Institute of Technology—Proceedings of International Conference on Advances in Computing Advances in Intelligent Systems and Computing vol. 174, 2012, pp. 41-48.*

(Continued)

*Primary Examiner* — Lewis A Bullock, Jr.
*Assistant Examiner* — Francisco Aponte
(74) *Attorney, Agent, or Firm* — Fountainhead Law Group PC

(57) ABSTRACT

Systems and methods for generating customized calculation execution graphs for producing analysis and reports from large stores of data are disclosed. The customized calculation execution graphs are instantiated from user supplied calculation definition tables and calculation input definition tables. The calculation definition tables and the calculation input definition tables are instantiated to produce a calculation graph model. The calculation definitions of the calculation graph model can be sorted based on the number of intermediate calculations required as input for each one of the defined calculation. The sorting calculation graph model can then be instantiated to generate the calculation execution graph. Such calculation execution graphs include a number of ordered calculation nodes with pairwise connections indicating the order of operations and data flow. The calculation execution graph can then be instantiated into a platform specific application programming language to run on a variety of server and client computers.

15 Claims, 14 Drawing Sheets

(56) References Cited

U.S. PATENT DOCUMENTS

| | | | |
|---|---|---|---|
| 2008/0082959 A1* | 4/2008 | Fowler | 717/104 |
| 2008/0256014 A1* | 10/2008 | Gould et al. | 706/48 |
| 2009/0138294 A1* | 5/2009 | Kumaran et al. | 705/7 |
| 2009/0327196 A1* | 12/2009 | Studer et al. | 706/47 |
| 2010/0063938 A1* | 3/2010 | Kantor et al. | 705/36 R |
| 2010/0281455 A1* | 11/2010 | Anand et al. | 717/104 |
| 2011/0078500 A1* | 3/2011 | Douros et al. | 714/15 |
| 2013/0290297 A1* | 10/2013 | Weyerhaeuser et al. | 707/717 |
| 2013/0290298 A1* | 10/2013 | Weyerhaeuser et al. | 707/719 |
| 2013/0290354 A1* | 10/2013 | Weyerhaeuser et al. | 707/754 |

OTHER PUBLICATIONS

Efficient Transaction Processing in SAP HANA Database—The End of a Column Store Myth—Vishal Sikka, Franz Färber, Wolfgang Lehner, Sang Kyun Cha, Thomas Peh, Christof Bornhövd—SAP—SIGMOD '12, May 20-24, 2012.*

* cited by examiner

800

| Row ID | Key Figure | Characteristics Set | Expression | Calc ID |
|---|---|---|---|---|
| 1 | ACTUALSQTY | REQUEST | SUM(ACTUALSQTY) | 101 |
| 2 | ACTUALSREV | REQUEST | SUM(ACTUALSREV) | 102 |
| 3 | ACTUALSPRICE | REQUEST | IF(ISNULL(ACTUALSQTY) or ACTUALSQTY=0;0; ACTUALSREV/ACTUALSQTY) | 103 |
| 4 | ACTUALSPROFIT | PRODUCT, LOCATION, CUSTOMER | ACTUALSREV-(ACTUALSQTY*COSTPERUNIT) | 104 |
| 5 | OPENORDERSPROFIT | PRODUCT, LOCATION, CUSTOMER | OPENORDERSREV-(OPENORDERSQTY*COSTPERUNIT) | 105 |

...

| 116 | FORECASTQTYALERT | REQUEST | SUM(FORECASTQTYALERT) | 301 |
| 117 | CAPACITY-OVERLOADALERT | LOCATION, RESOURCE | IF(CAPADEMANDUTILPCT > 1;1;0) | 302 |
| 118 | CAPACITY-OVERLOADALERT | REQUEST | SUM(CAPACITYOVERLOADALERT) | 303 |
| 119 | TARGETREVALERT | PRODUCT, LOCATION, CUSTOMER | IF(ABS(TARGETREV-CONSENSUSDEMANDREV)/CONSENSUSDEMANDREV>0.2;1;0) | 304 |
| 120 | TARGETREVALERT | REQUEST | SUM(TARGETREVALERT) | 306 |
| 121 | CONSENSUS-DEMANDREV | PRODUCTFAMILY, CUSTOMERREGION | SUM(CONSENSUSDEMANDREV) | 307 |

| Row ID | Calculation ID | Input Key Figure | Characteristics Set | From Storage |
|---|---|---|---|---|
| 1 | 101 | ACTUALSQTY | PRODUCT, LOCATION, CUSTOMER | X |
| 2 | 102 | ACTUALSREV | PRODUCT, LOCATION, CUSTOMER | X |
| 3 | 103 | ACTUALSREV | REQUEST | |
| 4 | 103 | ACTUALSQTY | REQUEST | |
| 5 | 104 | COSTPERUNIT | PRODUCT, LOCATION | X |
| 6 | 104 | ACTUALSREV | PRODUCT, LOCATION, CUSTOMER | X |
| 7 | 104 | ACTUALSQTY | PRODUCT, LOCATION, CUSTOMER | X |
| 8 | 105 | OPENORDERSREV | PRODUCT, LOCATION, CUSTOMER | X |
| 9 | 105 | OPENORDERSQTY | PRODUCT, LOCATION, CUSTOMER | X |
| 10 | 105 | COSTPERUNIT | PRODUCT, LOCATION | X |

⋮

| 179 | 301 | FORECASTQTYALERT | PRODUCT, LOCATION, CUSTOMER | |
| 180 | 302 | CAPADEMANDUTILPCT | LOCATION, RESOURCE | |
| 181 | 303 | CAPACITYOVERLOADALERT | LOCATION, RESOURCE | |
| 182 | 304 | CONSENSUSDEMANDREV | PRODUCT, LOCATION, CUSTOMER | |
| 183 | 304 | TARGETREV | PRODUCT, LOCATION, CUSTOMER | X |
| 184 | 306 | TARGETREVALERT | PRODUCT, LOCATION, CUSTOMER | |
| 185 | 307 | CONSENSUSDEMANDREV | PRODUCT, LOCATION, CUSTOMER | |

*Fig. 9*

| KFID | CALCID | PLAN LEVEL | STORED | EXPR | LENGTH | CODEID | PLAREA |
|---|---|---|---|---|---|---|---|
| CONSENSUSDEMANDQTY | | PERPRODLOCCUST | X | ? | 0 | ? | ZTESTSOP1 |
| CUSTOMERRATIO | | PERPRODLOCCUST | X | ? | 0 | ? | ZTESTSOP1 |
| DEMANDPLANNINGQTY | | PERPRODLOCCUST | X | ? | 0 | ? | ZTESTSOP1 |
| CONSENSUSDEMANDQTY | 150 | PERPRODLOCCUST | | IF(ISNULL(CONSENSUSDEMANDQTY),DEMANDPLANNINGQTY,CONSENSUSDEMANDQTY) | 1 | | ZTESTSOP1 |
| CONSENSUSDEMANDQTY | 160 | PERPRODLOCCUST | | SUM(CONSENSUSDEMANDQTY) | 2 | ? | ZTESTSOP1 |
| DEPENDENTDEMAND | 161 | PERPRODCUST | | CONSENSUSDEMANDQTY*CUSTOMERRATIO | 3 | ? | ZTESTSOP1 |
| DEPENDENTDEMAND | 162 | REQUEST | | SUM(DEPENDENTDEMAND) | 4 | ? | ZTESTSOP1 |

510 — Map the calculation execution graph into an executable instance for specific application platform or database 520 — Store instantiated platform specific application in a data store.

*Fig. 13*

SYSTEM AND METHOD FOR GENERATING HIGH PERFORMANCE CALCULATORS FOR CALCULATION GRAPHS

CROSS REFERENCE TO RELATED APPLICATIONS

Not Applicable

BACKGROUND

Unless otherwise indicated herein, the approaches described in this section are not prior art to the claims in this application and are not admitted to be prior art by inclusion in this section.

The present disclosure relates to customizing calculation intensive applications that read data, manipulate data, and report from large collections of data, and in particular, to systems and methods for generating high performance calculators for the complex calculation graphs required by such applications. Conventional systems and methods for generating such calculators for business analysis applications requires the use of specialized coding languages implemented by skilled or experienced application developers. Accordingly, the use of such, conventional systems is a highly complex, time-consuming and expensive endeavor. These disadvantages are exacerbated because the desired data analysis for which various companies turn to such applications varies from company to company, which makes implementing customized implementations of the applications prohibitive, if not impossible.

One exemplary category of such applications include sales and operations planning applications, or so-called "S&OP" applications. Many companies rely on S&OP applications to provide them with analysis of data stored in disparate or common databases that contain information regarding various aspects of a particular business or enterprise. These data stores include minute details regarding suppliers, inventory, capacity, demand, and other business specific information that various decision makers use for establishing goals, plans, and projections, as well as for evaluating past performance or adjusting expectations. Often, the data for such analysis is collected by and organized in enterprise resource planning ("ERP") systems. Occasionally, S&OP applications can be included as one of the modules of an ERP application. In other embodiments, data can be collected and organized in other types systems and applications including, but not limited to, finance management systems, supply chain planning systems, and central management systems.

In most conventional S&OP application packages, and other similar applications, the desired analysis, results, and reports are hardcoded into the software package at the time the S&OP application is designed or implemented. The nature of hardcoding the desired analysis into the S&OP application prevents easy customization for specific companies and for individual divisions of the same company. The calculations involved in an S&OP can be dependent on or require input from additional calculations or chains of calculations that can reach many levels deep. For instance, each calculation can require inputs ranging from direct reads a retrieval of information store database level data store, such as a database, as well as outputs from one to many intermediate calculations.

To service the needs of each company, or even various individuals or divisions within each company, many lines of code, often numbering in the millions of lines, would need to be augmented to achieve the desired customized results. Since the analysis and the resulting reports from an S&OP application are typically performed on a periodic basis, augmenting the S&OP application would prove to be cost and time prohibitive for most companies. For example, most businesses typically perform S&OP analysis and reports on a quarterly basis. Changing the S&OP application on a quarterly basis would be an arduous process, even for the most resource rich companies.

Thus, there is a need for improved customizable or configurable analysis of complex or multilayered sets of complex data and dependent calculations. The interdependencies of the complex data and dependent calculations can usually be represented as calculation execution graphs. Modeling and instantiating calculation execution graphs can be arduous and cost prohibitive endeavor that prevents many companies of all sizes for providing access to customized analysis and planning software, such as S&OP applications. The present invention solves these and other problems by providing systems and methods for automatically generating calculators for calculation graphs.

SUMMARY

Embodiments of the present invention improve systems and methods for generating calculators for processing complex, multilayered calculation graphs. In one embodiment the present invention includes a method that includes receiving, in a computer system, a calculation definition table comprising a plurality of unique calculation identifiers and a calculation input definition table associated with the calculation definition table. The calculation input definition table includes multiple calculation input definitions each associated with one of the unique calculation identifiers. Such methods also include generating a calculation execution graph in response to the calculation definition table and the calculation input definition table.

Related embodiments are directed toward methods in which each of the unique calculation identifiers is associated with a key figure, an expression, and a characteristic set for which the expression is defined. Similarly, generating the calculation execution graph can include generating a calculation definition model comprising a plurality of calculation definitions, wherein each of the calculation definitions is associated with a calculation identifier and a length designation, wherein the length designation corresponds to a number of intermediate calculations required for an input required by the calculation definition.

In yet other method embodiments, generating the calculation execution graph further includes sorting the plurality of calculation definitions based on the length designation associated which each of the calculation definitions. Generating the calculation execution graph can further include linking each of the plurality of calculation definitions with at least one other of the plurality of calculation definitions in response to sorting the plurality of calculation definitions. Such methods can also include generating a platform specific application by mapping the calculation execution graph into a specific programming language.

Various other embodiments are directed toward non-transient computer readable medium that includes computer readable code, that when executed causes a processor to implement a method that includes receiving a calculation definition table comprising a plurality of unique calculation identifiers, receiving a calculation input definition table associated with the calculation definition table, wherein the calculation input definition table comprises multiple calculation input definitions each associated with one of the unique calculation identifiers, and generating a calculation execution graph in response to the calculation definition table and the calculation input definition table.

In related embodiments, each of the unique calculation identifiers can be associated with a key figure, an expression, and a characteristic set for which the expression is defined. Generating the calculation execution graph can include generating a calculation definition model comprising a plurality of calculation definitions, wherein each of the calculation definitions is associated with a calculation identifier and a length designation, wherein the length designation corresponds to a number of intermediate calculations required for an input required by the calculation definition. In yet other embodiments, generating the calculation execution graph can further include sorting the plurality of calculation definitions based on the length designation associated which each of the calculation definitions.

In some embodiments, generating the calculation execution graph further includes linking each of the plurality of calculation definitions with at least one other of the plurality of calculation definitions in response to sorting the plurality of calculation definitions.

In yet other embodiments, the computer readable code can include instructions for causing the processor to generate a platform specific application by mapping the calculation execution graph into a specific programming language.

Yet other embodiments are directed toward a computer system including a processor, a memory coupled to the processor, and a network interface, wherein the memory comprises computer readable code, that when executed, causes the processor to receive a calculation definition table comprising a plurality of unique calculation identifiers, receive a calculation input definition table associated with the calculation definition table, wherein the calculation input definition table comprises multiple calculation input definitions each associated with one of the unique calculation identifiers, and generate a calculation execution graph in response to the calculation definition table and the calculation input definition table. In related embodiments, each of the unique calculation identifiers is associated with a key figure, an expression, and a characteristic set for which the expression is defined.

In other embodiments the computer readable code can further include code that causes the processor to generate a calculation definition model comprising a plurality of calculation definitions, wherein each of the calculation definitions is associated with a calculation identifier and a length designation, wherein the length designation corresponds to a number of intermediate calculations required for an input required by the calculation definition. The computer readable code can also include code that causes the processor to sort the plurality of calculation definitions based on the length designation associated which each of the calculation definitions.

In yet other embodiments, the computer system, can also include code that causes the processor to link each of the plurality of calculation definitions with at least one other of the plurality of calculation definitions in response to sorting the plurality of calculation definitions. The computer readable code can also include code that causes the processor to generate a platform specific application by mapping the calculation execution graph into a specific programming language.

The following detailed description and accompanying drawings provide a better understanding of the nature and advantages of the present invention.

BRIEF DESCRIPTION OF THE DRAWINGS

FIG. 8 illustrates a simplified calculation definition table according to various embodiments of the present invention.

FIG. 9 illustrates a simplified calculation input definition table according to various embodiments the present invention.

FIG. 10 illustrates a simplified calculation definition model according to various embodiments the present invention.

FIG. 13 is a flowchart of a method for generating a platform specific calculator for executing any calculation execution graph according to various embodiments of the present invention.

DETAILED DESCRIPTION

Figure 1:
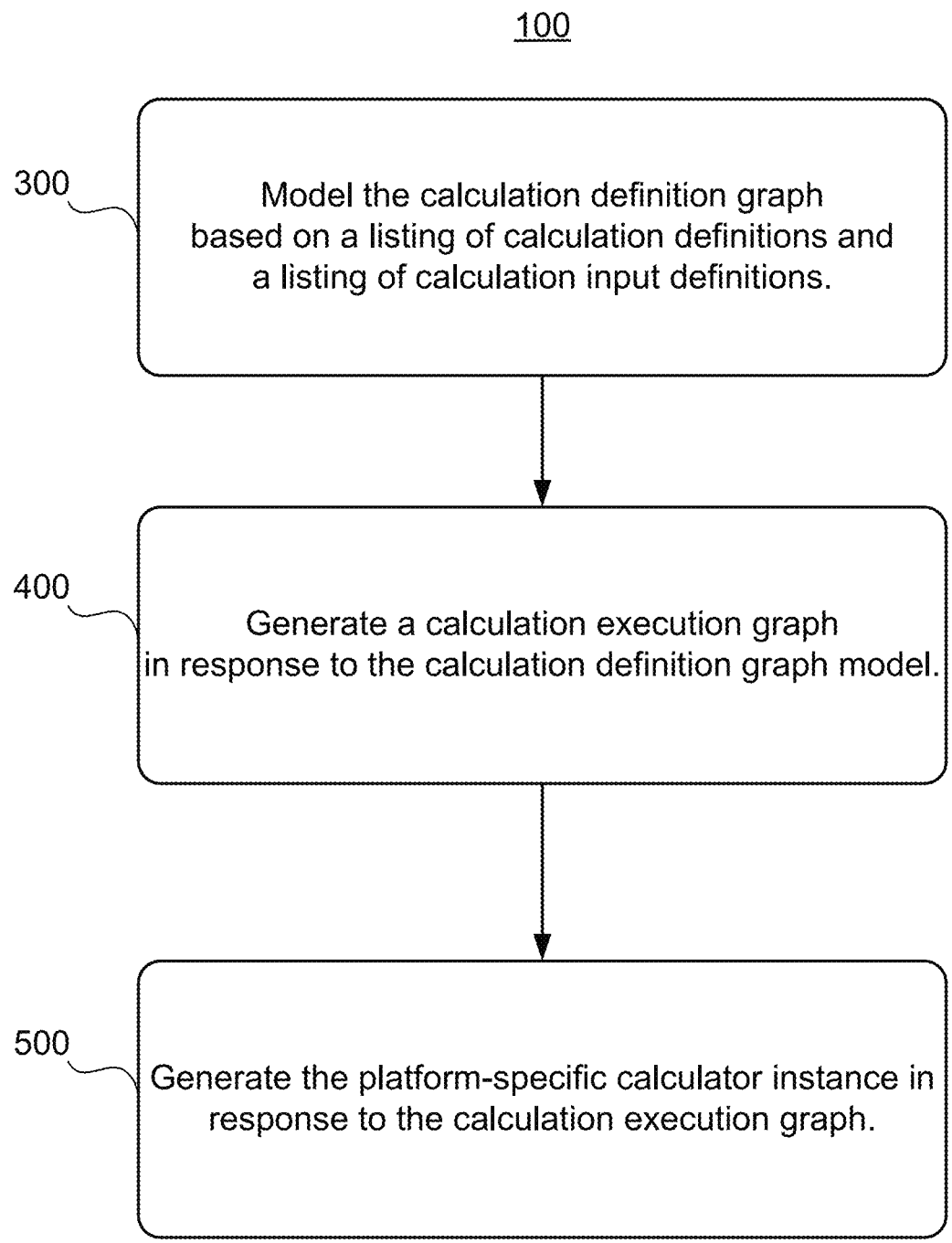
FIG. 1 is a flowchart of a method according to various embodiments of the present invention.

Described herein are techniques for systems and methods for generating high-performance calculators for calculation graphs that include complex data structures and/or multilayered calculations. Various embodiments are directed towards systems and methods for automatically generating a general purpose and platform specific calculators for large or complex sets of data and interdependent calculations that can be customized are configured by non-technical users, such as a business analyst or business executive. To create the desired customized calculation or analysis, a user can provide a plain language specification of the desired analysis.

Such plain language specifications can include natural language definitions of mathematical expressions or desired analysis. The natural language definitions can include references to known or well defined variables or functions readily available to other users and systems within a particular organization or business entity.

The natural language descriptions of mathematical expressions and the resulting analysis can then be converted into a data structure from which the order of operations, such as data reads and calculations, can be determined and arranged. In some embodiments, the structure includes multiple entries in a table. Each entry in a table is referred to herein as a calculation definition. The table of calculation definitions can then be related to a table of calculation input definitions. By instantiating each entry of the table of calculation definitions with reference to the table of calculation input definitions, various embodiments of the present invention can generate a calculation definition graph model. The calculation definition graph model can then be analyzed to determine the specific order of operations, and interdependencies. Based on the determined order of operations interdependencies. The entries of the calculation definition graph, which can take the form of a multidimensional table, can be topologically sorted to create an ordered set of operations, when executed in the prescribed order, results in a detailed calculation graph representation of the desired analysis or output.

Such calculation definition graphs are mathematical representations of the relationships between the various calculations. As used herein, the term graph refers to a mathematical structure used to model pairwise relations between objects from certain calculations and data functions. Accordingly, a graph can include a collection of "vertices" or "nodes" that represent the calculations or data functions and a collection of "edges" that connect pairs of vertices. While a calculation definition graph is an abstract representation of the interrelationships between various calculations and data functions, the graph can be used to create a visual representation of the order of execution by showing the calculations as nodes connected by directional lines or edges depicting the flow of data or inputs from one calculation to another. By instantiating the calculation definition graph, systems methods of the present disclosure can generate a platform specific calculator that can quickly and efficiently read from the requisite databases or data stores, perform the requisite calculations, and provide the desired analysis or report, with little to no reliance on manually changing lines of machine-readable code.

Embodiments of the present invention can be used to implement various types of calculation intensive applications that draw on, read from, manipulate, or report from vast amounts of data typically extant in business solution applications, such as enterprise resource planning (ERP) tools and applications. Specifically, embodiments of the present disclosure provide techniques for systems and methods for automatically generating a calculator that operates on vast amounts of data given a specific model calculation definition graph. Using such model calculation definition graphs, any user familiar with the intricacies of the business for which the model calculation graph is defined, can use and or augment the model to provide the analysis of the underlying data needed. Technical or software programming expertise is not needed.

FIG. 1 is a high-level flowchart of a method 100 for generating a platform specific calculator for executing complex calculation execution graphs, according to various embodiments the present invention. Method 100 can begin at step 300 in which one or more users model the calculation definition graph by defining a listing of calculation definitions and listing of calculation input definitions. The listings of calculation definitions and the listing of calculation input definitions can be in the form of tables that include a number of entries having data elements. The entries can include information that represents the interdependencies and/or the associations between the calculation definitions and the calculation input definitions. By instantiating the entries of the interrelated calculation definitions and calculation input definitions, a calculation graph model can be created.

In some embodiments, the calculation definition graph can be sorted according to a topological sort of the order of operations and required data reads and inputs from other calculations in the calculation definition graph to create an ordered list of mathematical calculations and/or expressions. The specific structures and data elements are described in more detail here in.

In step 400 of method 100, various embodiments of the present invention generate a calculation execution graph in response to the calculation definition graph. The calculation execution graph can be an abstract or a visual representation of the order of operations required for desired calculation or analysis. The calculation execution graph can include many calculation nodes with pairwise links defined by directional edges that describe the order of operations and data flow between the calculation nodes. Each node can be connected to multiple nodes through one to many associated edges or links.

In step 500 of method 100, the calculation execution graph, which is platform independent and describes a purely mathematical operation, can be used to generate the platform specific calculator instance. By generating the platform specific calculator instance at the end of method 100, a generated calculation execution graph can be used to reproduce the desired calculation or analysis on many different client and server applications.

Figure 2:
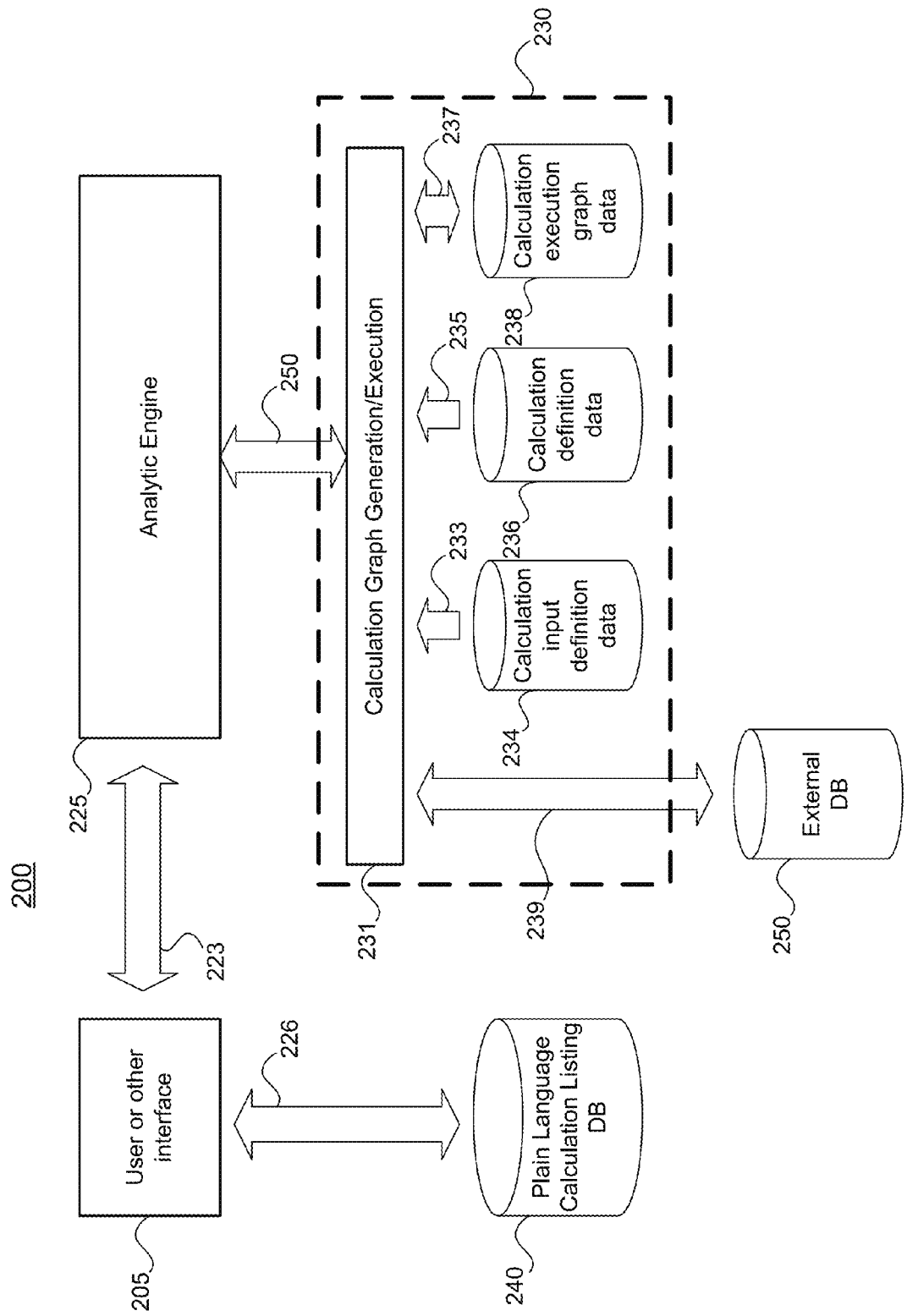
FIG. 2 illustrates a simplified system for generating calculation graphs according to various embodiments of the present invention.

FIG. 2 shows a simplified schematic of a system 200 that can be used for generating a calculation graph according to various embodiments of the present invention. System 200 can be referenced for a broad overview of the process, methods, and techniques involved for generating a calculator that sits over or operates on vast amounts of data. In various embodiments, a user can use user interface 205 to input the listing of plain language calculation descriptions. Alternatively, user can use user interface 205 to retrieve a previously stored plain language calculation specification from the plain language calculation listing database 240 via connection 226. The user interface 205 can be hosted on a client computer, such as a personal computer, laptop computer, or other computing device. Connection 226 can include both wired and wireless networking or data bus communication connections.

Next, the user can use the user interface 205, to translate the plain language calculation listing into a table of individual entries of calculation definitions and the related table of individual entries of calculation input definitions. The table of calculation definitions and the table of calculation input definitions can then be sent to an analytic engine 225 over connection 223. In various embodiments, the analytic engine 225 can be implemented in hardware and software, or combination of the two. Analytic engine 225 can be resident on the same client computer used to provide the user interface 205, or can be resident on a remote server computer. Accordingly, connection 223, over which user interface 205 sends the tables of calculation definitions and tables of calculation input definitions to the analytic engine 225 can include both wired and wireless networking communication connections or data bus connections.

The analytic engine 225 can analyze the tables of calculation definitions and the tables of calculation input definitions to verify that the composite calculations, expressions, command codes, subroutines, variables, ranges, and other constituent parts of each table are valid. Once the tables of calculation execution definitions and calculation input definitions are verified by the analytic engine 225, the tables can be made available to the calculation generator 230 via connection 250. As before, with connections 226 and 223, connection 250 can include both wired and wireless networking communication connections for instances in which the calculator generator 230 is resident in a remote server computer, as well as local wired data bus communication connections, for instances in which the calculator generator 230 is resident on the same computer executing or in which the analytic engine 225 is resident.

By instantiating each entry of the tables of calculation definitions and calculation input definitions, the calculation graph generation/execution module 231 can model the calculation definition graph. The calculation graph generation/ execution module 231 can, in some embodiments, retrieve calculation input definition data from data store 234 and calculation definition data from data store 236. Information stored in data stores 234 and 236 can include previously prepared or generated calculation input definitions and calculation definitions, respectively. The calculation graph generation/execution module 231 can then perform a topological sort of the modeled calculation definition graph. During the topological sort of calculation definition graph, each specific calculation can be ordered based on the availability of input data is from databases and intervening calculations to produce a calculation execution graph. For example, reads of data storage level data from a database, such as from external database 250, can be initiated first because most other calculations defined in the calculation execution graph model depend on receiving stored data from various data stores and databases, such as in an ERP. Such data reads or retrievals are typically referred to herein as base level, zero level, or source-type level calculations because they represent the most basic level of expression for obtaining specific analysis or an answer to a question.

Particular examples in which various embodiments of the present invention are useful include so-called sales and operations planning (S&OP) applications. Such S&OP applications can be dependent on and used to manipulate vast quantities of enterprise wide data. In the following description, for purposes of explanation, numerous examples and specific details are set forth in order to provide a thorough understanding of the present invention. In particular, a detailed description of one exemplary embodiment can be used to implement an S&OP application.

In an large scale calculation graph, many interrelated expressions and calculations can be defined, such that one expression or calculation may need inputs from several other expressions or calculations that can also require inputs from yet other expressions or calculations or data reads. As used herein, the terms expression and calculation can be used interchangeably to describe the mathematical or logical functionality of an application, such as a S&OP application. S&OP applications and other applications employing various embodiments of the present invention can be implemented using a combination of hardware, firmware, and software. The software component can be included as machine readable code stored on a non-transitory storage medium that is included in or can be read/accessed by a computer processor. The process of generating such code is the objective of one exemplary embodiment of the present invention.

In such embodiments, the method for providing a high performance calculator can begin with a detailed listing of plain language requirements or specifications. A user, even a non-technical business person, can set out a list of required calculations without knowing any specific programming language. For example, with reference to the S&OP application example, a user might need some particular business analysis to aid in the formulation of a business strategy or to answer a business-specific question. Such a listing of plain language requirements can include references to known or otherwise well-defined values or expressions for typical business related metrics for a given set of variables or variable ranges, i.e. regions, dates, customers, suppliers, products, etc. The plain language listing can also include novel or custom metrics that are defined in reference to other metrics or stored values. One example of a specific plain language listing of expressions is illustrated by the following bullet point list.

- If the CONSENSUSDEMANDQTY is null, i.e. not previously stored or calculated, then calculate the CONSENSUSDEMANDQTY for the characteristic set defined by user supplied values for PERIOD, PRODUCT, LOCATION and CUSTOMER by defining the CONSENSUSDEMANDQTY to be equal to DEMANDPLANNINGQTY for the same user supplied values for PERIOD, PRODUCT, LOCATION and CUSTOMER.
- Then, if DEMANDPLANNINGPRICE null, then calculate for PERIOD, PRODUCT and CUSTOMER value set by setting DEMANDPLANNINGPRICE equal to MARKETINGFORECAST for the PRICE PERIOD, PRODUCT and CUSTOMER value set.
- Then calculate the CONSENSUSDEMANDCOST per PERIOD, PRODUCT, LOCATION and CUSTOMER value set by multiplying CONSENSUSDEMANDQTY for the same characteristic value set with CONSTPERUNIT for the PERIOD, PRODUCT and LOCATION value superset
- Then there are similar calculations defined for the CONSENSUSDEMANDPRICE and the CONSENSUSDEMANDREV. Only difference is multiplication of quantity by price instead of cost.
- Finally calculate CONSENSUSDEMANDPROFIT per PERIOD, PRODUCT, LOCATION and CUSTOMER value set by subtracting CONSENSUSDEMANDCOST from CONSENSUSDEMANDREV for the same characteristic value set The specific implementation of such a listing of necessary metrics and calculations can vary from user-to-user, from business division to business division, and from company-to-company based on the analysis required for the specific application, but it is possible that the key figures, such CONSENSUSDEMANDQTY, DEMANDPLANNINGQTY, DEMANDPLANNINGPRICE, MARKETINGFORECAST, CONSENSUSDEMANDCOST, CONSTPERUNIT, CONSENSUSDEMANDPRICE, CONSENSUSDEMANDREV, and CONSENSUSDEMANDPROFIT. can refer to well known or commonly defined values for a particular value set, i.e. PERIOD, PRODUCT, LOCATION and CUSTOMER, defined by a user.

Such plain language specifications can then be entered into a table or spreadsheet loaded into a memory or stored on a non-transient computer readable medium in a number of different formats, such as comma delimited or tab delimited text files, a spreadsheet, or a database table. Each key figure can have a separate row, column or other distinguishable entry that lists the characteristic value set requirements, and the mathematical or logical expression for the calculation with the necessary inputs or other key figures. One example of the short list of plain language expressions translated into a table format is shown below in Table 1. For each key figure, the expression is defined relative to other key figures and/or data stored in an accessible data store with reference to user-provided values for the characteristic set of values. For example, the characteristic set of values can include information for a specific date/time or a range of dates/times (i.e. PERIOD), one or more product identifiers or codes (i.e. PRODUCT), a specific set of places or regions identifiers or codes (i.e. LOCATION), or a specific set of customers (i.e. CUSTOMER).

TABLE 1

| Key Fig. | Characteristics Set | Expression |
| --- | --- | --- |
| CONSENSUS-DEMANDQTY | PERIOD, PRODUCT, LOCATION, CUSTOMER | IF(ISNULL(CONSENSUSDEMANDQTY), DEMANDPLANNINGQTY, CONSENSUSDEMANDQTY) |
| DEMAND-PLANNING-PRICE | PERIOD, PRODUCT, CUSTOMER | IF(ISNULL(DEMANDPLANNINGPRICE), MARKETINGFORECASTPRICE, DEMANDPLANNINGPRICE) |
| CONSENSUS-DEMANDCOST | PERIOD, PRODUCT, LOCATION, CUSTOMER | CONSENSUSDEMANDQTY * COSTPERUNIT |
| CONSENSUS-DEMANDPRICE | PERIOD, PRODUCT, CUSTOMER | IF(ISNULL(CONSENSUSDEMANDPRICE), DEMANDPLANNINGPRICE, CONSENSUSDEMANDPRICE) |
| CONSENSUS-DEMANDREV | PERIOD, PRODUCT, LOCATION, CUSTOMER | CONSENSUSDEMANDQTY * CONSENSUSDEMANDPRICE |
| CONSENSUS-DEMAND-PROFIT | PERIOD, PRODUCT, LOCATION, CUSTOMER | CONSENSUSDEMANDREV-CONSENSUSDEMANDCOST |

Figure 3:
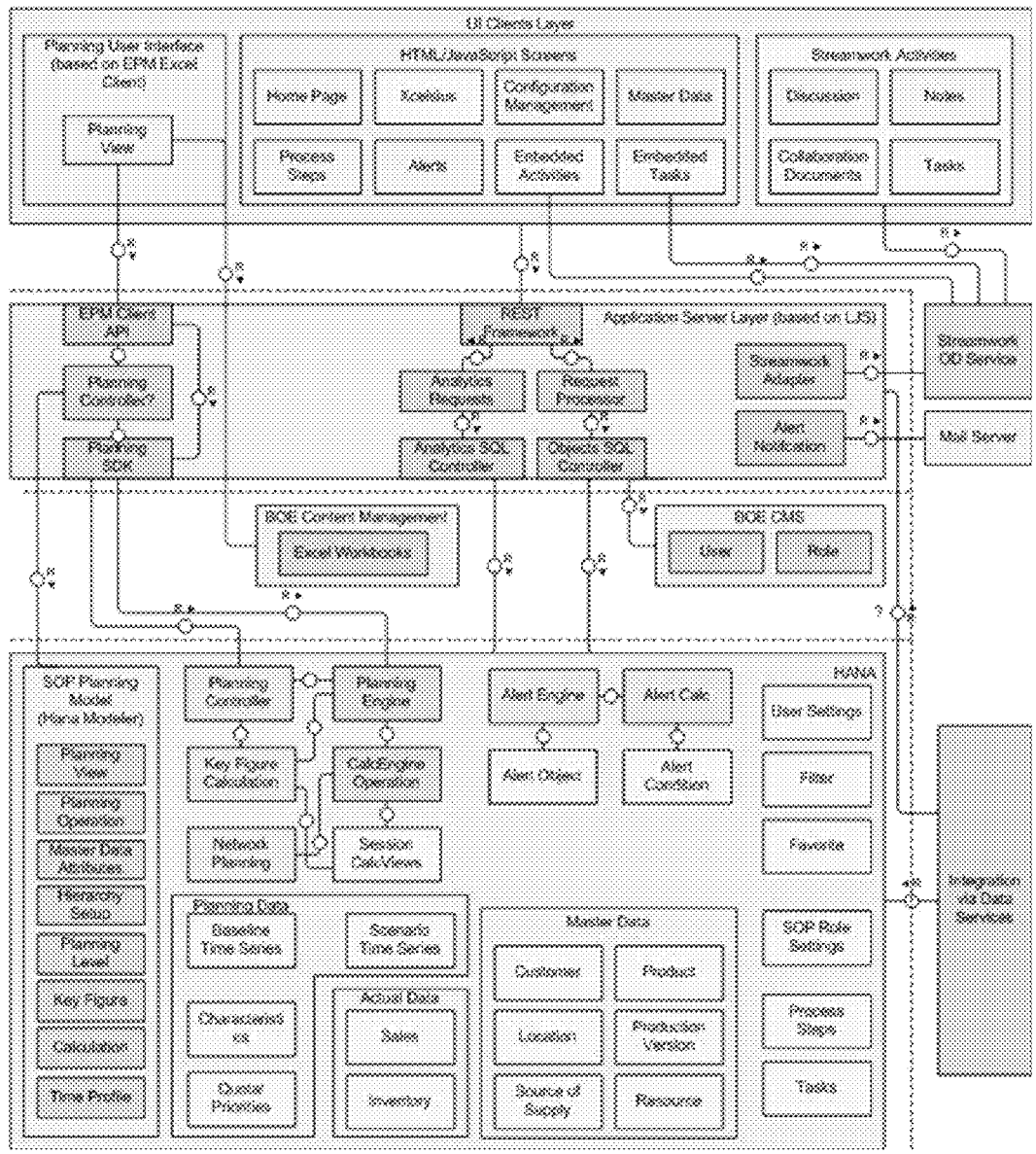
FIG. 3 illustrates a simplified system architecture that can be improved by various embodiments of the present invention.

FIG. 3 is a schematic view of a system in which various embodiments can be employed to improve performance and provide customized analysis by automatically generating calculators that operate on the underlying data in response to an editable table or tables of calculation definitions and calculation input definitions. FIG. 3 shows a schematic of a system embodiment of an S&OP architecture that contains various elements for calculation modeling using HANA™ from SAP™. While this specific example refers to HANA™ for the purposes of explanation, one of ordinary skill in the art will realize that other systems can also be used.

In the embodiment shown in FIG. 3, the S&OP planning model modules (or HANA™ Modeler) can include various components or modules i.e. planning level module, key figure module, and calculation module. Typically, the S&OP calculation definition will generate an S&OP calculation scenario definition. When requested from the planning UI, the planning controller instantiates the executable S&OP calculation scenario based on the S&OP calculation scenario definition providing a planning session as the data source. It is in this aspect of the process that various embodiments the present invention can be advantageously implemented.

In general, in S&OP applications, analytical planning data is contained in the attributes tables, key figures tables, time series and time period tables from one or more databases. An analytical view of such data can be a join of the three such tables. The planning controller can create a simulation session by creating a Planning Session based on Analytical View and then creates a Calculation Scenario based on the Planning Session. It returns the ID of the session and the ID of the Calculation Scenario to an SQL Client.

In some embodiments, the SQL Client can do a typical select against the Calculation Scenario. The Calculation Scenario based on the parameter values of the query and planning master data does the required aggregation and calculation to return the desired result set.

Modeling the Calculation Definition Graph

Figure 4:
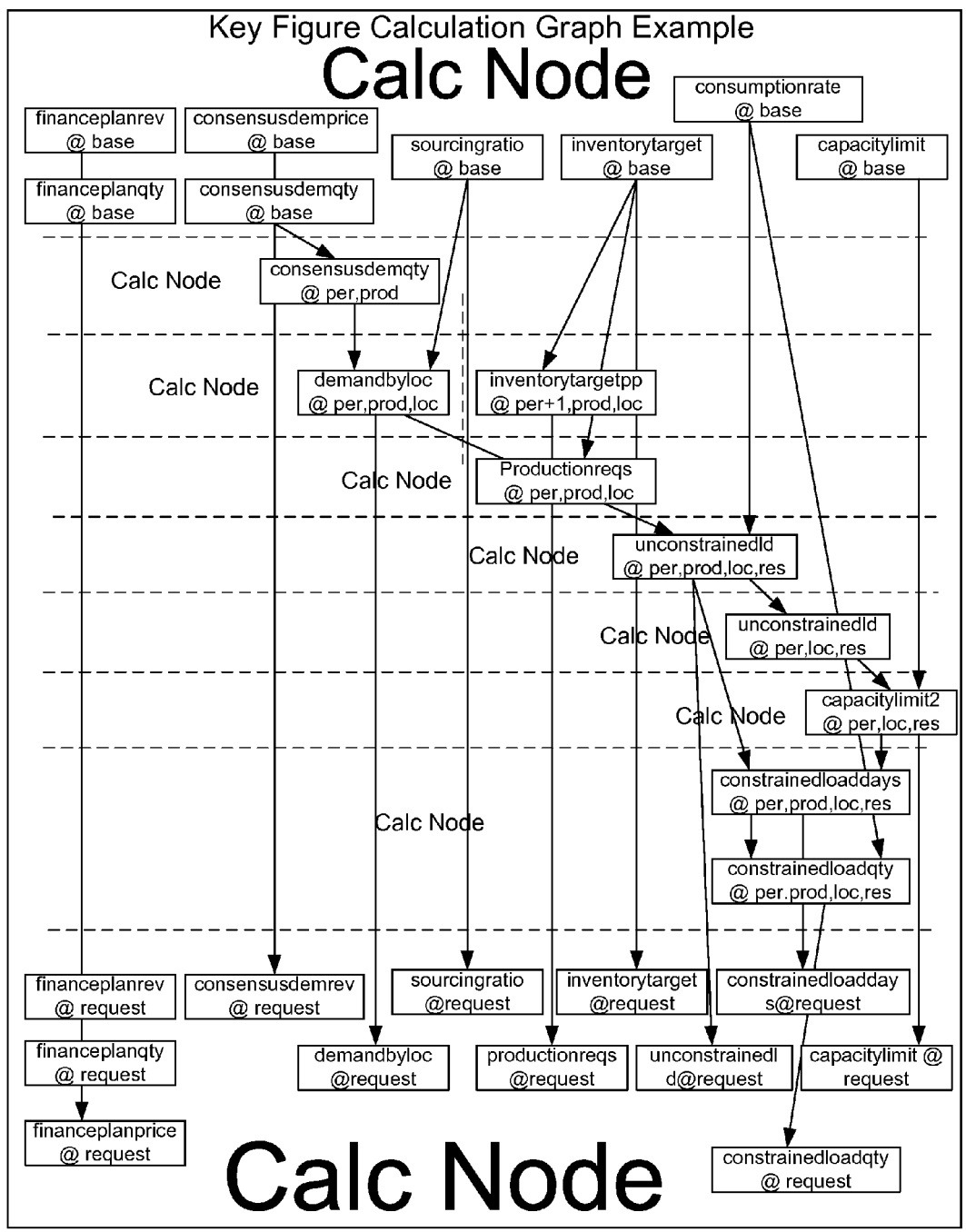
FIG. 4 illustrates a calculation execution graph having calculation execution nodes according to various embodiments of the present invention.

FIG. 4 shows an example of a visual representation of a key figure calculation execution graph described herein. The key figure calculation execution graph illustrates the settings required to define such calculations for consumption in the S&OP application. FIG. 4 also shows how a S&OP calculation definition graph maps to a corresponding calculation scenario or calculation execution graph.

In FIG. 4, calculation execution nodes are represented by areas separated by dashed lines. S&OP key figure calculation definitions map to NewDB calculation nodes by grouping together S&OP key figure calculation definitions such that all stored key figures map to attributes of a single calculation scenario source node. Additionally, two key figure calculation definitions can require the same calculation node type in order to be included into the same calculation execution node, e.g. aggregation node versus L-code node. Two key figure calculation definitions can specify the same output planning level to be included into the same calculation execution node. Two calculation definitions usually require the same set of input planning levels or requires that one of the calculations is a simple transformation of the other calculation's output. Those calculation nodes can handle such inputs internally.

As shown in FIG. 4, the topmost calculation execution node includes various base level calculations which can represent read or retrieval functions from various data sources. The calculations or calculation definitions, represented by each box in the topmost calculation node are defined by user-provided characteristic sets or set values for particular financial planning, consensus, sourcing, inventory, consumption rate, and capacity information. The information can be maintained by an ERP for various divisions of a single business entity. Even at the base level, calculations can be pairwise linked to one another. As each subsequent calculation nodes, reading from the top of FIG. 4 to the bottom, each calculation node can receive data from one or more of the calculation nodes in the base level or a previous level. As shown, the calculations in the layers between the base level, i.e. the topmost level, and the request level, i.e. the bottommost level, can require various inputs from any or all of the previously calculated calculation nodes. Finally, information resulting from the calculation nodes in the request level, can be presented to the user for the value set desired.

Figure 5:
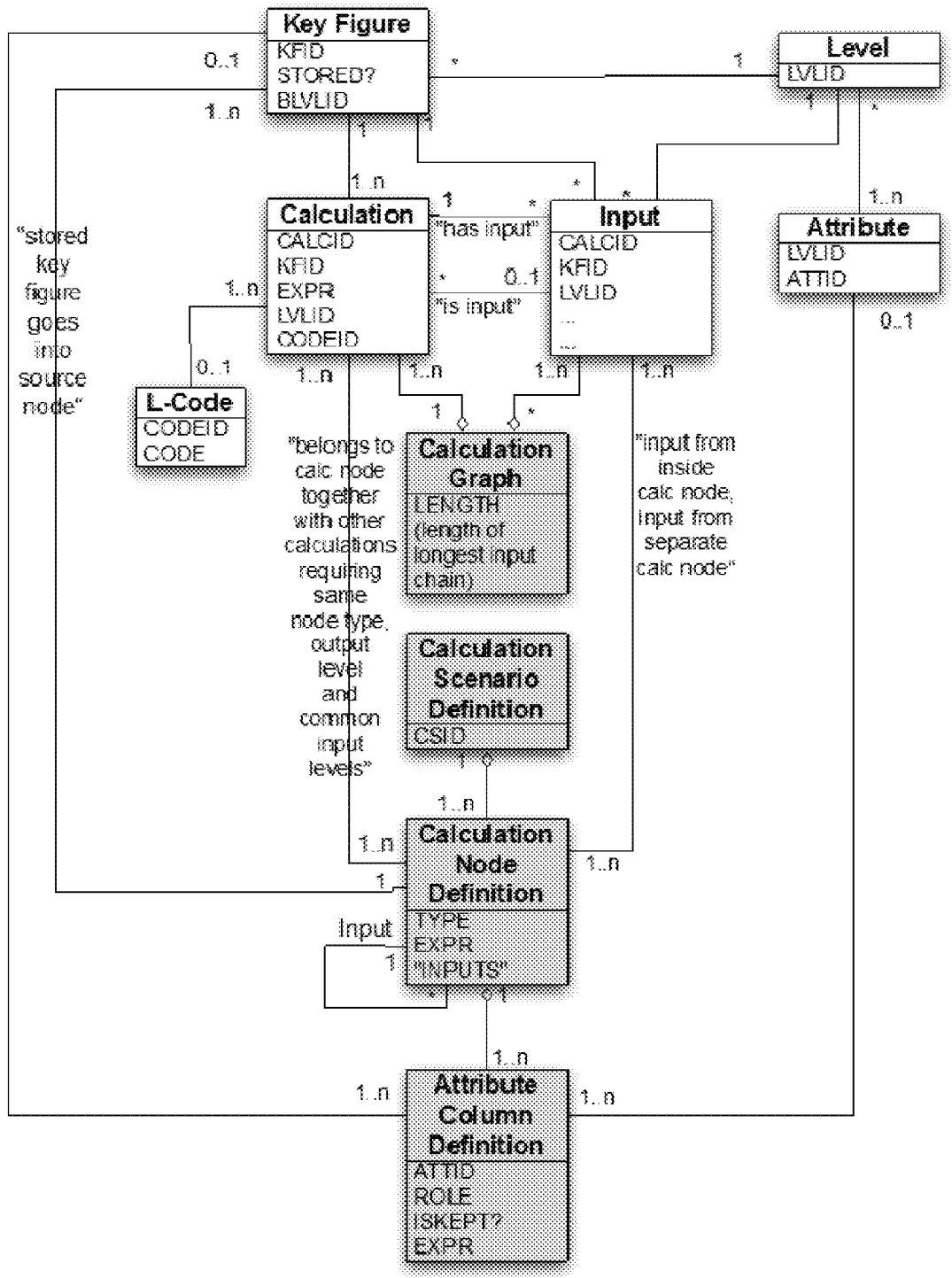
FIG. 5 illustrates an abstraction of a calculation definition according to various embodiments of the present invention.

FIG. 5 is a high level diagram of a meta-model for calculation definition modeling. In FIG. 5, each white box represents an S&OP calculation definition and the gray boxes represent the resulting calculation scenario. As shown each key figure defines S&OP key figures and their basic settings.

Level/attribute define all planning levels needed to define the base and calculation levels of key figures. A key figure can have one or more calculation definitions. For example multiple calculations for a key figure may be required on multiple planning levels as inputs for other key figure calculations. The math behind the calculation can be either defined by a (TREX-) expression or some L-code. A calculation has inputs which are key figure values on specified planning levels (input level). Calculations themselves can become inputs to other calculations. The calculation and input definitions combined can be viewed as a calculation graph with an associated length defined as the longest input chain leading of the calculation.

Calculation Node Definition

Each calculation node can have a unique type/operation. For example, each calculation node can include an aggregation, projection, L-code, or other operation or function defined by an associated expression. Each calculation node can include attribute columns Embodiments calculation node include a key figure with a calculation expression, the calculation expression is part of the calculation node attribute definition. S&OP calculation definitions can be grouped into calculation execution nodes according to the rules described herein. In related embodiments, S&OP calculation input definitions translate into calculation nodes as input for other calculation nodes.

Calculation Execution Graphs.

Calculation execution graphs or calculation scenarios are terms that can be used interchangeably to refer to groups of connected calculation nodes. Querying a calculation scenario can result in a data transformation flow starting with reading the stored key figure values into the calculation scenario memory and continuing with transformations, such as SQL and L-code transformations, all the way to unique default node, which provides the calculation results to a client, such as a SQL client. Calculation graph generation/execution module 231 can call and or retrieve saved calculation scenarios from the calculation execution graph data store 238, as shown in FIG. 2. As used herein, the terms calculation definition and calculation node can express the specific math or functions underlying each individual calculation.

Figure 6:
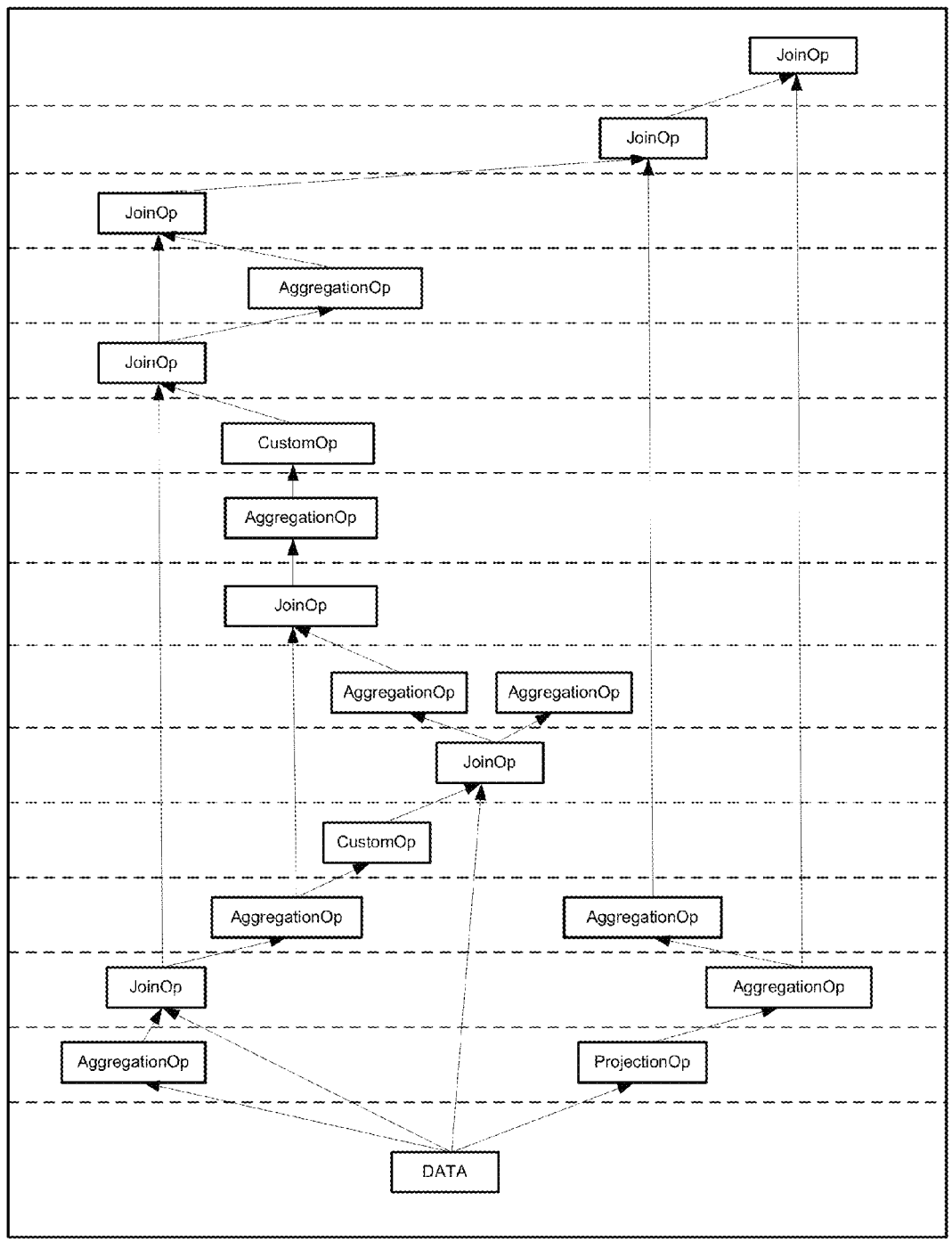
FIG. 6 illustrates a simplified calculation execution graph according to various embodiments of the present invention.

FIG. 6 is a simplified visual representation of an exemplary calculation scenario. As shown visual presentation of FIG. 6, the calculation scenario for calculation execution graph begins at the bottom with the designation of a set of data. The data can be read or retrieved from one or more databases accessible by the computer system running the calculation scenario. The data is then fed into various calculation nodes. In the present example, the data can be input into aggregation operation node, join operation nodes in two different levels, and a projection operation. Once the data is received, the receiving calculation nodes can perform the specific operation, and then send the resulting output to one or more other calculation nodes as shown in FIG. 6.

Modeling Calculation Definition Graphs

Figure 7:
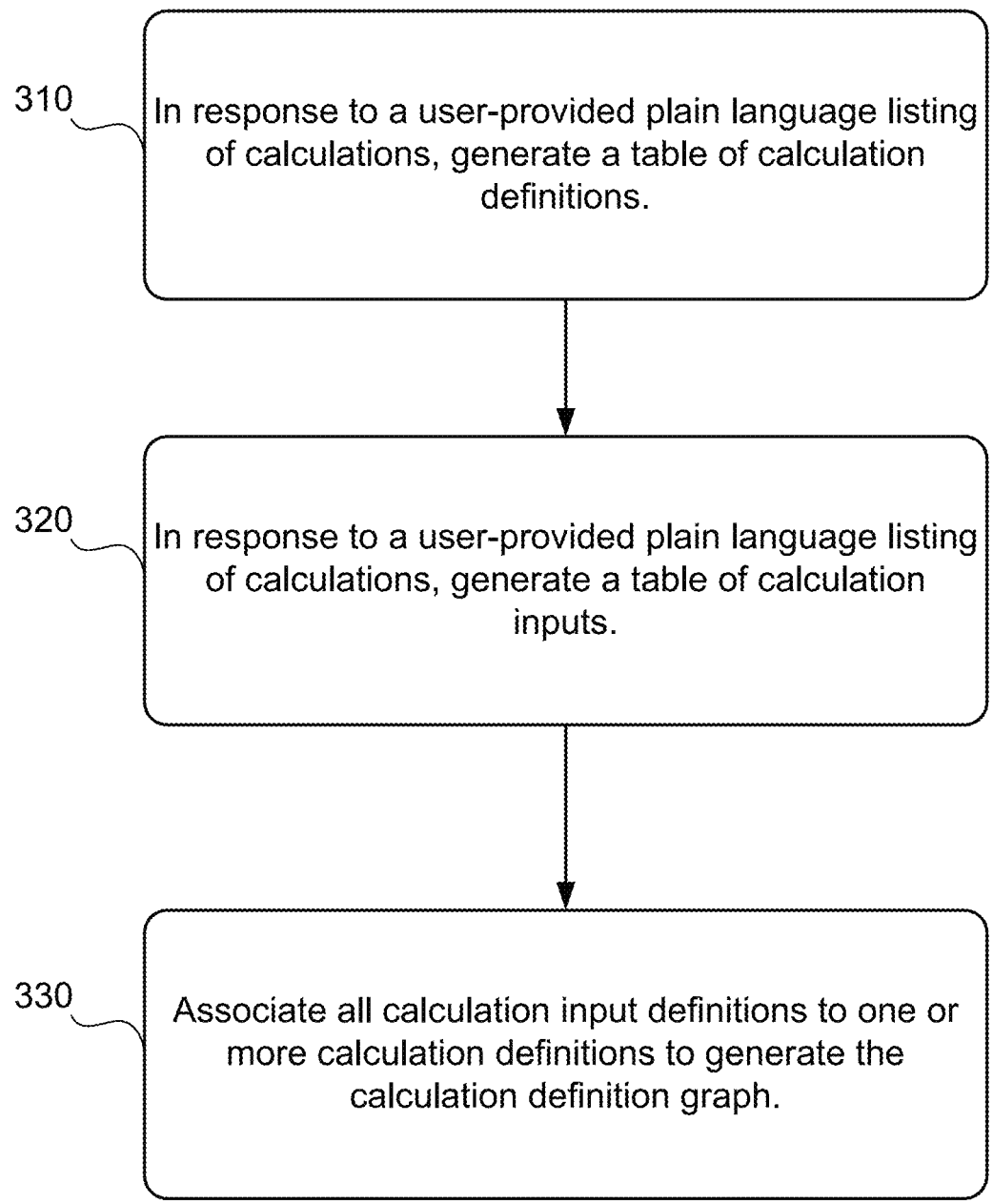
FIG. 7 is a flowchart of a method for generating a calculation definition model according to various embodiments of the present invention.

FIG. 7 is a flowchart of a method 300 for modeling the calculation definition graph according to various embodiments of the present invention. At step 310, in response to a user provided plain language listing of calculations, a table of calculation definitions are generated. Each calculation definition can include various elements and properties. For example, as depicted in FIG. 8, each calculation definition entry in the calculation definition table 800 can include a row ID for designating the location in the calculation definition table, and a calculation ID for uniquely identifying the calculation definition. Each calculation definition can also include a characteristics set or value set for which a given calculation is defined. For example, as shown in FIG. 8, the calculation definition with calculation ID 105 is defined for a characteristics set based on PRODUCT, LOCATION, and CUSTOMER where the specific product, location, and customers are provided by user input or other calculations. In related embodiments, each calculation definition can also include an arithmetic expression to define the calculation formula for the given calculation. In some embodiments, the expression can also include a call to or specification for an outside program to perform the calculation instead of an expression. Using outside programs to perform the calculation can enhance the capability of the resulting calculation execution graph as well as increasing performance by allowing parallel processing of data and calculations.

As shown in FIG. 8, each calculation definition can include multiple input definitions, as in the specific definitions of the expressions of calculation definition table 800. To clearly define the calculation input definitions, a separate associated calculation input definition table can be generated. One such calculation input definition table 900 is shown in FIG. 9.

As shown in FIG. 9, each calculation input definition in the calculation input definition table 900 can include various properties. For example, each calculation input definition can include a calculation ID. The calculation ID for each calculation input definition establishes an Association of with a calculation definition of the calculation definition table 800, for example. Each calculation input definition can also include a designation for an input key figure and a characteristics set for which the input key figure is be pre-calculated. The properties included in the calculation input definition table 900 provide the basis for sorting the order in which the associated calculation definitions will be instantiated in the calculation execution graph.

Associating all calculation definitions in table 800 with one or more calculation input definitions in table 900 provides the basis for generating the calculation execution graph. The calculations resulting from the calculation definitions of the calculation definition table 800 are the nodes of the graph and the calculation inputs resulting from the calculation input definitions of the calculation input definition table 900 are the edges between the nodes. In such embodiments, inputs and calculations can be linked to each other via a tuple that can include a designation of a key figure and the characteristics set. The linking of the inputs to the calculations results in a directed acyclic graph, referred to herein as the calculation definition graph.

FIG. 10 shows an example calculation definition graph 1000 according to various embodiments of the present invention. As shown, calculation definition graph 1000 includes a number of entries instantiated from calculation definition table 800 and calculation input definition table 900. Each entry can include a key FIG. 1D, or KFID, the calculation ID, or CALCID, a plan level designating the specific characteristics set, an indication as to whether or not the information is stored or calculated, and a listing of the expression or external code that will generate the value for the associated key FIG. 1D. Each entry also includes a length that indicates the number of intermediate calculations from the base level data read. For example, the length indicates the number of calculations in the longest input path for a given calculation. For example a particular calculation can have two immediate inputs. One input can include a stored value and the other inputs can include a calculation itself, which is based on a stored value. In such cases, the calculation would have a length of 2 as a result of the input, which includes a calculation. In some embodiments, the entries of the calculation definition graph 1000 can be sorted by the length, thus indicating the order in which each key figure will be calculated.

In embodiments in which the expression can include a call to an external program, the code ID, or CODEID, can include a pointer to a program that performs the given calculation. In such embodiments, including a code ID is helpful for calculation that are more complex than simple aggregations or expressions. At runtime, the calculation will be performed by executing the code that will produce the calculated numbers of the particular associated calculation.

Additionally, each entry of the calculation definition graph can include a planning area, or PLAREA, entry. Including the planning area entry allows various embodiments of the present invention to define multiple occasions in one system installation, each application insulation can have its own set of calculation definitions. The calculation definitions can be common or different.

Generating the Calculation Execution Graph

Figure 11:
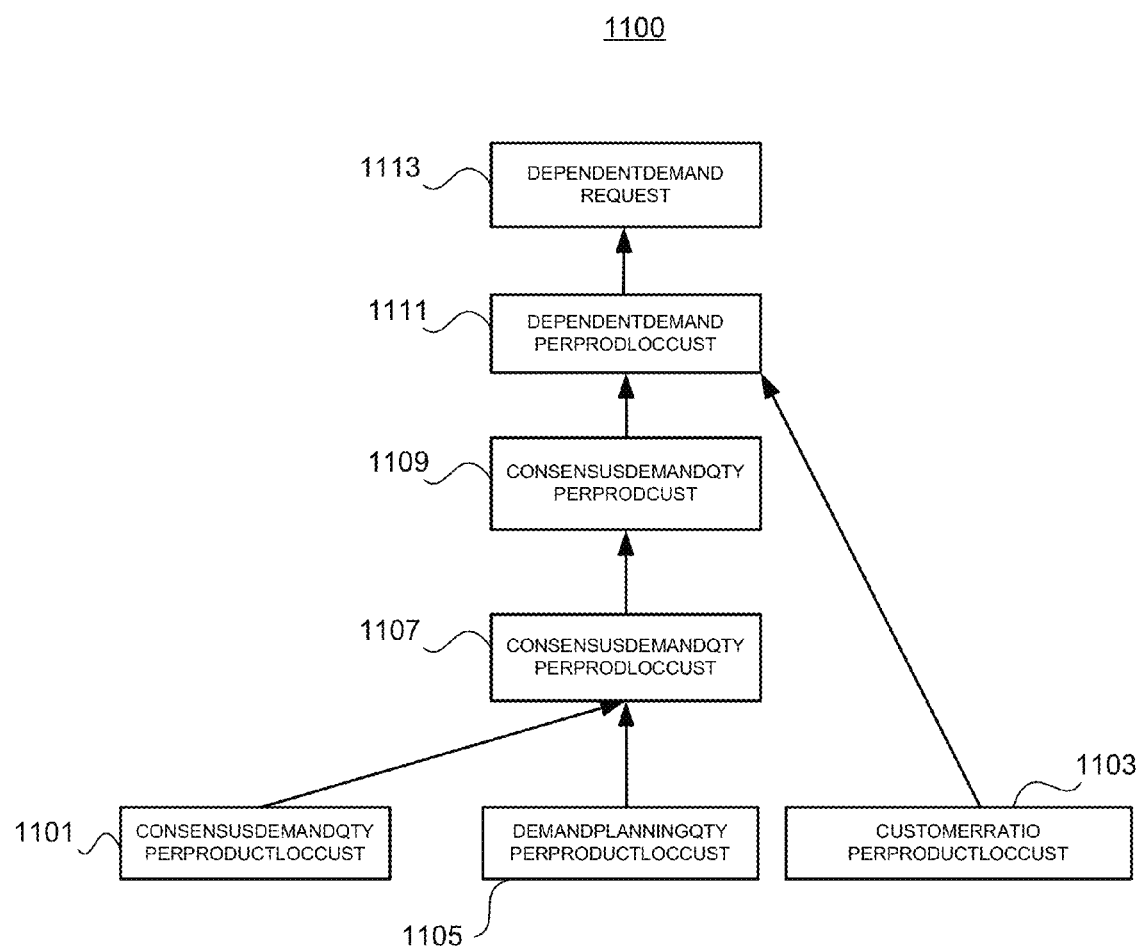
FIG. 11 illustrates a simplified calculation execution graph according to various embodiments of the present invention.

In some embodiments, the calculation graph generation/execution module 231 can map the calculation definition graph to a calculation execution graph. FIG. 11 shows a calculation execution graph 1100 based on the calculation definition graph 1000. Calculation execution graph 1100 is a simplified calculation execution graph. In practice, calculation execution graphs can include many path lengths ranging anywhere from four, as shown in FIGS. 11, to 25 or higher. The size and depth of the calculation execution graph is dependent on the number of dependencies between the defined calculations, essentially the size of the calculation definition graph As shown, calculation execution graph includes a number of calculations or nodes. Nodes 1101, 1103, 1105 represent reads or retrievals of data storage in various data stores. This is indicated in calculation definition graph 1000 with indications in the STORED column today value of 0 in the LENGTH column. The definition of 0 length indicates that there are no intermediate calculation steps or links between the data required as input for the calculation of the node. In the particular example shown in FIG. 11, nodes 1101, 1103, and 1105. All pull information from one or more data stores, according to the plan level, or characteristics set, on a per product, location, and customer basis, as designated by PER-PRODLOCCUST. This plan level defines the level on which the key figure values are defined. Selection/filter of data is something else. If key figures are available on PERPROD-LOCCUST this data can be filtered by period, product, location, customer values. Note that a filter can be pushed down to the source level. Some calculations require to aggregated to key figures across all applicable characteristics first, then consume this aggregation in a distribution function which brings in these characteristics again, and only after that the filter can be applied=post filtering. The filtering logic is implemented in this embodiment 1107, 1109, 1111 are intermediate calculations or those that transform sets of characteristics values and key figure values inputs into a different single set of characteristics values and key figures providing the calculated values. Each of the edges 1100, i.e. the direction lines that link the nodes, represent the data flow between calculation nodes from input nodes to consuming nodes. For example, note 1107 sets the CONSENSUSDEMANDQTY key figure on a per product, location, and customer basis, in accordance with the expression shown in calculation definition table 1000. In this particular example, if the key figure CONSENSUSDEMAND-QTY is null, the calculation node 1107 sets CONSENSUSDEMANDQTY equal to DEMANDPLAN-NINGQTY. Node 1109, per definition calculation graph, sets the CONCENSUSDEMANDQTY as the sum of CONSEN-SUSDEMANDQTY per product and customer. Node 1111 multiplies CONSENSUSDEMANDQTY by CUSTOMER-RATIO from node 1103. Finally, node 1113 sets the DEPEN-DENTDEMAND as the sum the DEPENDENTDEMAND from node 1111. The result can then be sent to one or more systems or displayed to one or more users.

Figure 12:
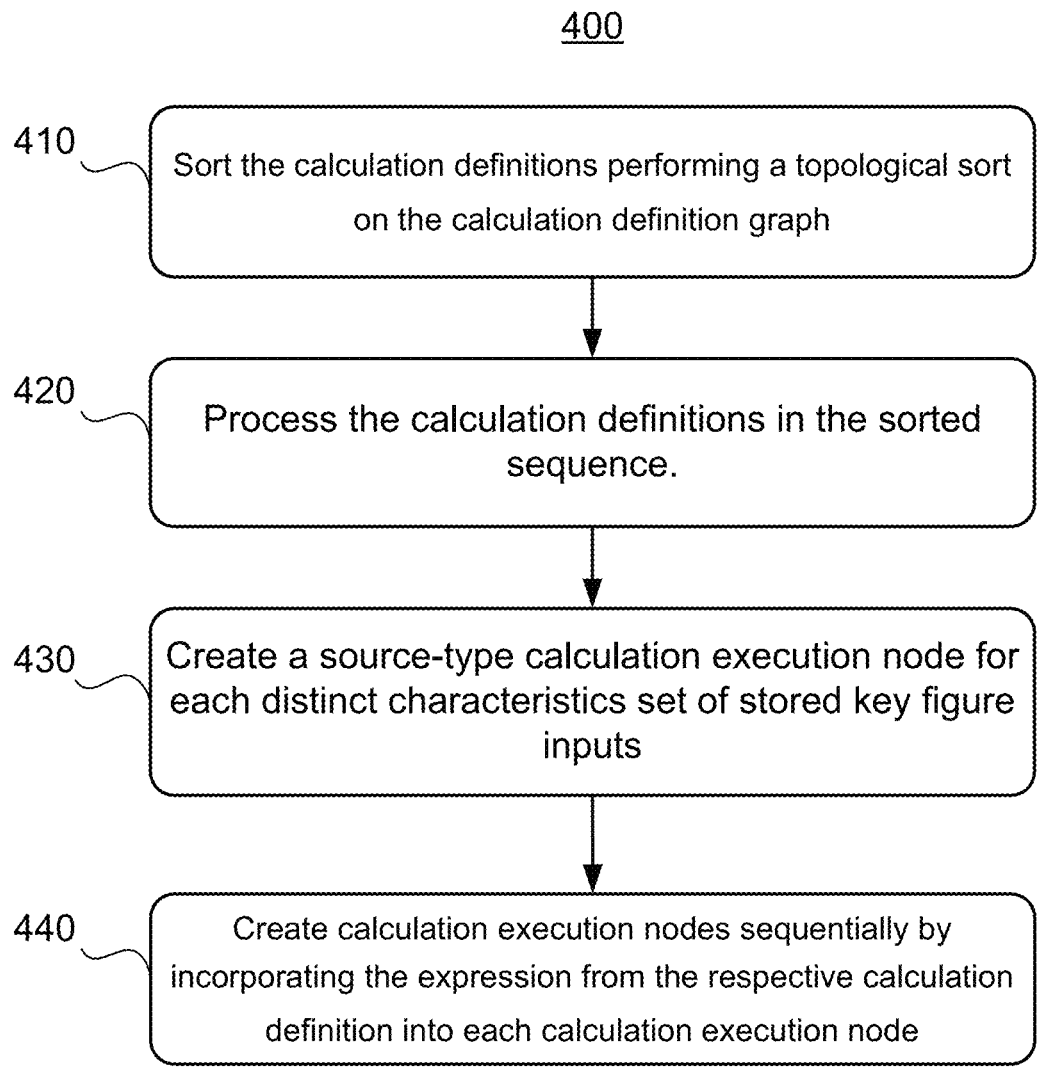
FIG. 12 is a flowchart of a method for generating a calculation execution graph according to various embodiments the present invention.

The calculation graph generation/execution module 231 can construct the execution graphs using various logic. FIG. 12 depicts a method for hundred by which the calculation graph generation/execution module 231 constructs the calculation execution graph according to various embodiments the present invention. In step 410, the calculation definitions of the can be sorted by performing a topological sort on the calculation definition graph. Accordingly, after such sorting all intervening calculations that a specific calculation definition needs as inputs are listed higher up in the calculation definition graph. For example, in a table representation of the calculation definition graph, calculation definitions that require input from more intervening calculations are listed below are in the table. This is illustrated in the calculation definition graph 1000 shown in FIG. 10. In step 420, the calculation definitions can be processed in the sorted sequence.

Processing the calculation definitions in the sorted sequence results in the creation of the calculation execution nodes containing the calculation definitions that can be calculated simultaneously. An example of calculation execution nodes, or bundled calculation definitions, is shown in FIG. 4. As depicted in FIG. 4, each calculation execution node can include one or more calculation definitions. By performing each calculation definition in the calculation execution note simultaneously, the calculation definition graph can be performed faster and more efficiently than if each one of the calculation definitions were processed in series.

For each distinct characteristics set of stored key figure inputs, a source-type calculation execution node can be created, in step 430. Each source-type calculation execution node can be responsible for reading in stored key figures for respective characteristics set from one or more data stores. Calculation execution nodes can be created sequentially by incorporating the calculation definition expressions into the calculation execution node sequentially and linking them to existing calculation execution nodes, including both source-type and non-source-type as inputs.

Calculation definitions can be bundled together into a calculation execution node in various circumstances, in step 440. In some embodiments, calculation definitions can be bundled into a calculation execution node, if all of the calculation definitions refer to the same characteristics set, all stored key figure inputs of all the calculation definitions refer to the same sets of characteristics sets, all calculated key figure inputs of all the calculation definitions refer to the same sets of characteristics sets, and the calculation definitions exhibit identical filter-pushdown restrictions (e.g. sum up values before filter vs. filter before summing up values), and are positioned at the same length/level in the calculation definition graph. In other embodiments, calculation definitions can be bundled into a common calculation execution node together with other calculation definitions if they refer to the same characteristics set and their inputs refer to a subset of these other calculation definitions which are already included in the calculation execution node.

A calculation node with multiple inputs can be mapped to a join operation. The join operation can join attributes derived by evaluating an intersect of the root characteristics of the input nodes. The root characteristics of the input nodes are the smallest subset of characteristics of a characteristic value set which uniquely identify any characteristic value set, i.e. non-root characteristics values can be inferred from the root characteristic values.

In some embodiments, two inputs referring to the request characteristics set can be mapped to a union operation directly followed by an aggregation operation to mimic a dynamic join on request characteristics unknown at design time. All calculations can come together in a common union operation which allows exploiting native parallelization for calculations on the given platform. For example, the SQL select can be specified against this union operation from where sub-processes can be spawned to provide key figure values from different branches in parallel. An example of such parallelization is shown in FIG. 4.

In some embodiments, every calculation node which calculates key figures for the requested characteristics can be connected and sent directly to the final union node to avoid interference with other calculations when key figures are requested. Any branches not required for the requested key figure values are excluded from processing, e.g. By outer joins in case of an SQL implementation. In the SAP implementation this can be achieved by including condition nodes that switch between branches or empty data sets depending on the selected key figures.

Generate the Platform-Specific Calculator Instance

FIG. 13 is a flowchart of a method 500 for generating a platform specific calculator instance. In step 510, calculation execution graph can be mapped into an executable instance for a given application platform or database. An example of a straightforward calculator includes a set of nested SQL statements or stored procedures that can the calculation nodes into individual select statements linked to each other via sub-selects. In some embodiments of the present invention generating platform specific calculator instances can include mapping the calculation execution graph into a calculation scenario in calculation engine of the SAP™ HANA™ system. In step 520, instantiated platform specific application can be stored in a data store for later retrieval. The instantiated platform specific application can then be executed on demand by various servers and clients.

Various embodiments of the present invention can include implementation of algorithm principles followed in SAP's implementation of the calculator generator on HANA™. For instance, for the calculator code can run directly in the database runtime as close as possible to the stored data. In related embodiments, the data source nodes can be aggregation operations on top of OLAP constructs for better stored data read performance. Filter pushdown logic, which can be embodied as a where clause, can be applied dynamically as a function of requested key figure values. In the SAP implementation this was achieved by different versions of source nodes for different push-down scenarios. The selection of the optimal source node can be implemented as a function of the requested key figures.

Figure 14:
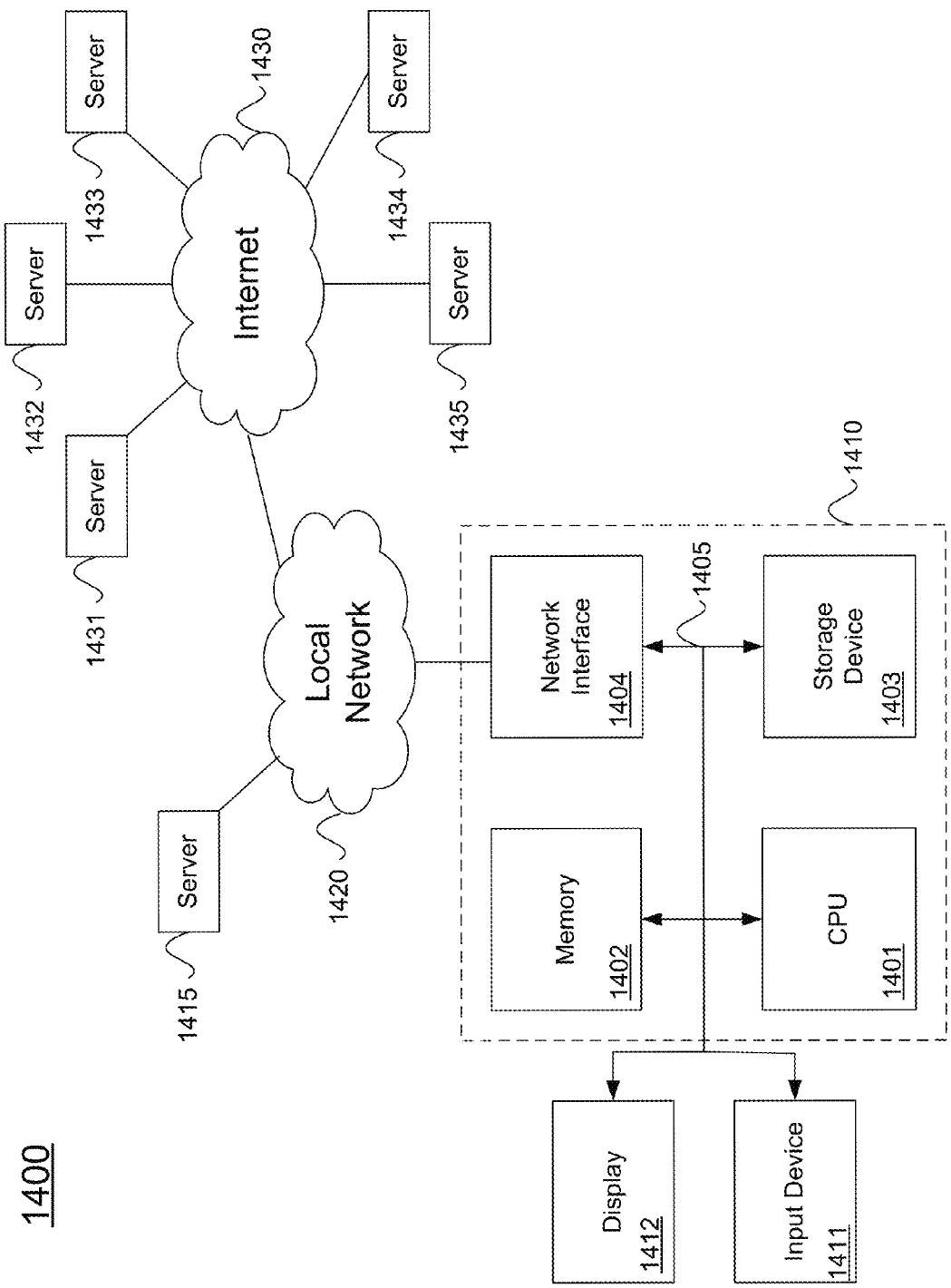
FIG. 14 illustrates an exemplary computer system and network connections that can be used for implementing various embodiments of the present invention.

FIG. 14 illustrates an example computer system and networks that may be used to implement one embodiment of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. The information instructions can be in the form of computer readable code stored on the storage device, accessible and executable by processor to implement various techniques and methods of the present disclosure. Common forms of storage devices include non-transients computer readable media, for example, a hard drive, a magnetic disk, an optical disk, a CD, a DVD, a flash memory, a USB memory card, or any other medium from which a computer can read.

Computer system 1410 may be coupled via the same or different information bus, such as bus 1405, to a display 1412, such as a cathode ray tube (CRT) or liquid crystal display (LCD), for displaying information to a computer user. An input device 1411 such as a keyboard and/or mouse is coupled to a bus for communicating information and command selections from the user to processor 1401. The combination of these components allows the user to communicate with the system.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431 across the network. Software components described above may be implemented on one or more servers. A server 1431 may transmit messages from one component, through Internet 1430, local network 1420, and network interface 1404 to a component or container on computer system 1410, for example. Software components of a composite application may be implemented on the same system as other components, or on a different machine than other software components. This process of sending and receiving information between software components or one or more containers may be applied to communication between computer system 1410 and any of the servers 1431 to 1435 in either direction. It may also be applied to communication between any two servers 1431 to 1435.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. It will be evident, to one skilled in the art that the present invention as defined by the claims may include some or all of the features in these examples alone or in combination with other features described below, and may further include modifications and equivalents of the features and concepts described herein. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving, in a computer system, a user-provided plain language calculation expression, wherein the user-provided plain language calculation expression specifies a plurality of calculation identifiers without specifying at least one calculational relationship between a first calculation identifier in the plurality of calculation identifiers and a second calculation identifier in the plurality of calculation identifiers;
determining, by the computer system the at least one calculational relationship in accordance with system-provided definitions;
generating, by the computer system, a calculation definition table in accordance with the user-provided plain language calculation expression, wherein the calculation definition table comprises the plurality of calculation identifiers and the at least one calculational relationship;
determining, by the computer system a calculational sequence associated with the plurality of calculation identifiers;
generating, by the computer system, a calculation input definition table in accordance with the calculation definition table, wherein the calculation input definition table comprises multiple calculation input definitions each associated with one of the calculation identifiers and the calculational sequence; and
generating, by the computer system, a calculation execution graph in accordance with the calculation input definition table, wherein the calculation execution graph is readable by a plurality of enterprise applications and wherein generating the calculation execution graph comprises generating a calculation definition model comprising a plurality of calculation definitions, wherein each of the calculation definitions is associated with a calculation identifier and a length designation, wherein the length designation corresponds to a number of intermediate calculations required for an input required by the calculation definition.

2. The method of claim 1 wherein each of the calculation identifiers is associated with a key figure, an expression, and a characteristic set, for which the expression is defined.

3. The method of claim 1 wherein generating the calculation execution graph further comprises sorting, by the computer system, the plurality of calculation definitions based on the length designation associated which each of the calculation definitions.

4. The method of claim 3 wherein generating the calculation execution graph further comprises linking, by the computer system, each of the plurality of calculation definitions with at least one other of the plurality of calculation definitions in response to sorting the plurality of calculation definitions.

5. The method of claim 1 further comprising generating, by the computer system, a platform specific application by mapping the calculation execution graph into a specific programming language.

6. A non-transitory computer readable medium comprising:
computer readable code, that when executed causes a processor in a computer system to implement a method comprising:
receiving a user-provided plain language calculation expression, wherein the user-provided plain language calculation expression specifies a plurality of calculation identifiers without specifying at least one calculational relationship between a first calculation identifier in the plurality of calculation identifiers and a second calculation identifier in the plurality of calculation identifiers;
determining the at least one calculational relationship in accordance with system-provided definitions;
generating a calculation definition table in accordance with the user-provided plain language calculation expression, wherein the calculation definition table comprises the plurality of calculation identifiers and the at least one calculational relationship;
determining a calculational sequence associated with the plurality of calculation identifiers;
generating a calculation input definition table in accordance with the calculation definition table, wherein the calculation input definition table comprises multiple calculation input definitions each associated with one of the calculation identifiers and the calculational sequence; and
generating, a calculation execution graph in accordance with the calculation input definition table, wherein the calculation execution graph is readable by a plurality of enterprise applications and wherein generating the calculation execution graph comprises generating a calculation definition model comprising a plurality of calculation definitions, wherein each of the calculation definitions is associated with a calculation identifier and a length designation, wherein the length designation corresponds to a number of intermediate calculations required for an input required by the calculation definition.

7. The non-transitory computer readable medium of claim 6 wherein each of the calculation identifiers is associated with a key figure, an expression, and a characteristic set for which the expression is defined.

8. The non-transitory computer readable medium of claim 6 wherein generating the calculation execution graph further comprises sorting the plurality of calculation definitions based on the length designation associated which each of the calculation definitions.

9. The non-transitory computer readable medium of claim 8 wherein generating the calculation execution graph further comprises linking each of the plurality of calculation definitions with at least one other of the plurality of calculation definitions in response to sorting the plurality of calculation definitions.

10. The non-transitory computer readable medium of claim 6 further comprising generating a platform specific application by mapping the calculation execution graph into a specific programming language.

11. A computer system comprising
a processor;
a memory coupled to the processor; and
a network interface,
wherein the memory comprises computer readable code, that when executed, causes the processor to perform a method of:
receiving a user-provided plain language calculation expression, wherein the user-provided plain language calculation expression specifies a plurality of calculation identifiers without specifying at least one calculational relationship between a first calculation identifier in the plurality of calculation identifiers and a second calculation identifier in the plurality of calculation identifiers;

determining the at least one calculational relationship in accordance with system-provided definitions;

generating a calculation definition table in accordance with the user-provided plain language calculation expression, wherein the calculation definition table comprises the plurality of calculation identifiers and the at least one calculational relationship;

determining a calculational sequence associated with the plurality of calculation identifiers;

generating a calculation input definition table in accordance with the calculation definition table, wherein the calculation input definition table comprises multiple calculation input definitions each associated with one of the calculation identifiers and the calculational sequence; and generating, a calculation execution graph in accordance with the calculation input definition table, wherein the calculation execution graph is readable by a plurality of enterprise applications and wherein generating the calculation execution graph comprises generating a calculation definition model comprising a plurality of calculation definitions, wherein each of the calculation definitions is associated with a calculation identifier and a length designation, wherein the length designation corresponds to a number of intermediate calculations required for an input required by the calculation definition.

12. The computer system of claim 11 wherein each of the calculation identifiers is associated with a key figure, an expression, and a characteristic set for which the expression is defined.

13. The computer system of claim 11 wherein the computer readable code further comprises code that causes the processor to sort the plurality of calculation definitions based on the length designation associated which each of the calculation definitions.

14. The computer system of claim 13 wherein the computer readable code further comprises code that causes the processor to link each of the plurality of calculation definitions with at least one other of the plurality of calculation definitions in response to sorting the plurality of calculation definitions.

15. The computer system of claim 11 wherein the computer readable code further comprises code that causes the processor to generate a platform specific application by mapping the calculation execution graph into a specific programming language.

* * * * *